United States Patent [19]

Kaida

[11] Patent Number: 5,091,792
[45] Date of Patent: Feb. 25, 1992

[54] LIQUID CRYSTAL DISPLAY HAVING REDUCED ITO SHADING MATERIAL AND METHOD OF MANUFACTURING SAME

[75] Inventor: Yoshimasa Kaida, Tokyo, Japan

[73] Assignee: International Business Machines Corporation, Armonk, N.Y.

[21] Appl. No.: 685,574

[22] Filed: Apr. 15, 1991

[30] Foreign Application Priority Data

Apr. 13, 1990 [JP] Japan ................... 2-96650

[51] Int. Cl.[5] .......................................... G02F 1/133
[52] U.S. Cl. .......................................... 359/67; 359/87
[58] Field of Search ........................... 350/336, 339 F

[56] References Cited

U.S. PATENT DOCUMENTS

| | | | |
|---|---|---|---|
| 4,568,149 | 2/1986 | Sugata et al. | 350/334 |
| 4,591,240 | 5/1986 | Masaki et al. | 350/339 F |
| 4,712,874 | 12/1987 | Sekimura et al. | 350/336 |
| 4,733,948 | 3/1988 | Kitahara | 350/339 F |
| 4,867,537 | 9/1989 | Aoki et al. | 350/336 |
| 4,964,702 | 10/1990 | Sugimoto et al. | 350/339 F |

FOREIGN PATENT DOCUMENTS 62-135809 6/1987 Japan .
63-74033 4/1988 Japan .

*Primary Examiner*—Stanley D. Miller
*Assistant Examiner*—Anita Pellman Gross
*Attorney, Agent, or Firm*—David Aker

[57] ABSTRACT

A liquid crystal display and a method for manufacturing the same wherein the light transmissivity of selected regions of the indium tin oxide film forming the common electrode on a first substrate is decreased and the regions are made substantially non-reflecting by reducing the oxygen content of the film. The shading material thus produced does not reflect light to the thin film transistors which control the picture elements on a second, facing substrate and therefore does not affect their operation. Reduction is accomplished by providing a protective mask for areas that are not to be reduced, immersing the substrate containing the thin film with the protective mask applied thereto in an electrolyte, and applying a voltage sufficient to reduce the indium tin oxide in regions unprotected by the mask. The mask, which may be a photoresist, is then removed and the substrate may be incorporated into the display.

18 Claims, 3 Drawing Sheets

LIQUID CRYSTAL DISPLAY HAVING REDUCED ITO SHADING MATERIAL AND METHOD OF MANUFACTURING SAME

FIELD OF THE INVENTION

The present invention relates to liquid crystal displays. More particularly, it relates to liquid crystal displays having a shading member, and a method of manufacturing such displays.

BACKGROUND ART

U.S. Pat. No. 4,568,149 discloses that a shading member composed of, for example, aluminum may be provided between adjacent color filters (that is, between adjacent picture elements) on a transparent electrode formed of indium-tin-oxide (hereinafter abbreviated to ITO) or a mixture of indium oxide ($In_2O_3$) and tin oxide ($SnO_2$).

The method taught by this patent requires a large number of manufacturing steps, including a film forming step for making a transparent electrode, a film forming step for making a shading member, and an etching step for making the shading member. Moreover, the shading member projecting from the transparent electrode makes an injection of liquid crystal material difficult. Further, as the shading member is formed of a metal such as aluminum, the light from a back light is reflected by the shading member, and enters the thin film transistor provided on the substrate which faces the substrate on which the shading member is disposed. This may adversely affect the characteristics of the thin film transistor.

U.S. Pat. No. 4,733,948 discloses that a shading member composed of, for example, aluminum may be provided at a position between adjacent color filters on a transparent electrode disposed on one of two opposing substrates and facing a thin film transistor disposed on the other substrate.

The methods disclosed in this patent, as is the case for U.S. Pat. No. 4,568,149, requires a large number of steps including a film forming step for making a transparent electrode, a film forming step for making a shading member, and an etching step for forming the shading member.

Japanese Published Unexamined Patent Application (PUPA) 62-135809 discloses that a photoresist may be applied to a transparent conductive film composed of ITO which is provided on a transparent substrate, followed by exposure and development, thereby patterning the photoresist. Then the part of the transparent conductive film not coated with the photoresist is removed by etching, and using the patterned photoresist as it is as a masking material, a shading layer is formed of metal oxides in the region where no transparent conductive film is provided on the substrate.

The method disclosed in PUPA 62-135809 does not require the etching step for forming the shading layer, but does require the etching step for forming a transparent electrode, and also necessitates a film forming step for forming a transparent electrode and another film forming step for forming a shading layer.

Japanese PUPA 63-74033 discloses applying a photoresist on an ITO film; forming a pattern by exposure and development through a mask, then removing the part of the ITO film not coated with the photoresist by etching, and reducing the remaining ITO film as it is with the photorsist deposited thereon in a hydrogen plasma, thereby lowering the resistance of each side of the ITO film which has been patterned.

PUPA 63-74033 relates to the reduction of and ITO electrode, but is intended to lower the resistance of the ITO electrode, and does not suggest the use of the material obtained by reducing ITO as a shading material.

SUMMARY OF THE INVENTION

It is a principal object of the invention to provide a liquid crystal display which permits reducing the number of manufacturing steps for forming the shading material, and diminishes the reflection of light by the shading material.

It is another object of the invention to provide a liquid crystal display which does not exhibit a displacement in the level between the transparent electrode and the shading member.

It is still another object of the invention to provide a manufacturing method for a liquid crystal display which permits reduction in the number of manufacturing steps, for forming the transparent electrodes and the shading member.

In accordance with the invention, the material obtained by reducing ITO is used as a shading material, for example, between picture elements of a liquid crystal display. As the ITO is reduced, its light transmission diminishes to a low enough level for the product to be used as a shading material. Because the region adjacent to the transparent electrodes each of which composes a picture element electrode is generally where the shading is needed, the necessary shading member may be formed by reducing the region of ITO which is not protected with a mask, while protecting with the mask the ITO region which is to be used as the transparent electrode. Because this shading member is to exist in a single layer film of ITO, no difference in level occurs between the shading member and the transparent electrode. In addition, there is no need to separately form a film for forming the shading member, thus reducing the number of manufacturing steps. Furthermore, because the material obtained by reducing ITO causes only a small amount of light reflection, use of this material as a shading member does not adversely affect the characteristics of the thin film transistor facing the shading member because light is not reflected to the transistor.

DETAILED DESCRIPTION OF THE PREFERRED EMBODIMENT

Figure 1:
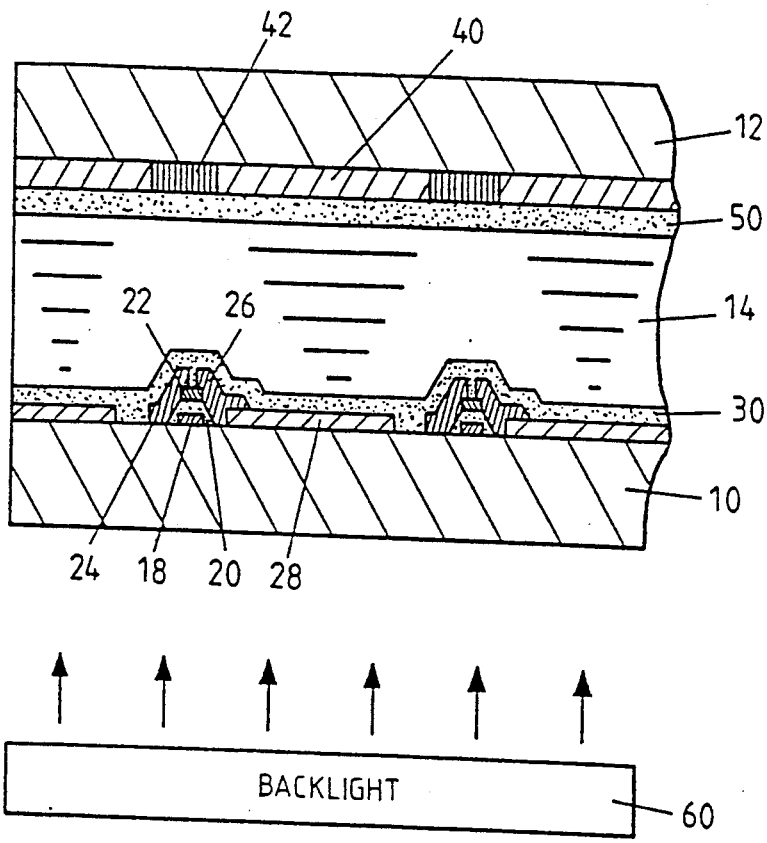
FIG. 1 is a cross-sectional view of a portion of an embodiment of a liquid crystal display according to the invention.

Referring to FIG. 1, between a thin film transistor (TFT) array substrate 10 and a facing substrate 12 which are arranged in a spaced parallel relationship to each other, a nematic liquid crystal material 14 is filled. The TFT array substrate 10 and the facing substrate 12 are both formed of a transparent glass. On the TFT array substrate 10, a thin film transistor (TFT) is formed for each picture element. That is, on the TFT array substrate 10, a gate electrode 18 is formed. A gate insulation film 20 formed on the gate electrode 18. On the gate insulation film 20, an amorphous silicon semiconductor layer 22 is formed. A drain electrode 24 and a source electrode 26 are connected to the semiconductor layer 22. The drain electrode 24 and the source electrode 26 are insulated from each other.

Figure 2:
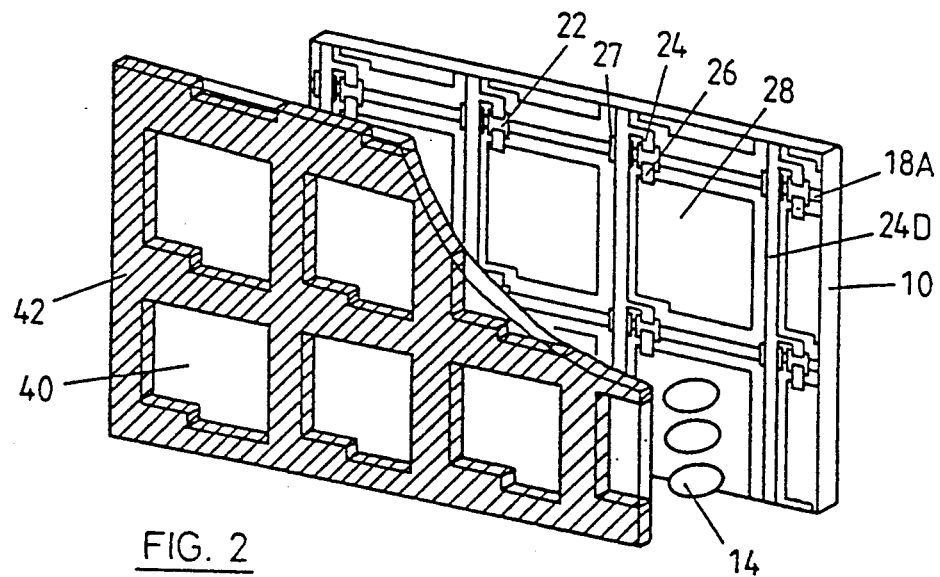
FIG. 2 is an exploded perspective view of the liquid crystal display shown in FIG. 1.

As shown in FIG. 2, the gate electrode 18 is connected to an address line 18A, and the drain electrode 24 to a data line 24D. The source electrode 26 is connected to a picture element electrode 28 consisting of ITO.

On the facing substrate 12, a common electrode 40 of ITO and a shading material or black matrix 42 consisting of a material obtained by reducing ITO are formed. The common electrode 40 and the shading member 42 are in the same plane (and of the same thickness), and there is thus no difference in level between them. As shown in FIG. 2, the shading member 42 is formed in a region which covers an area not occupied by the picture element electrodes 28 on the TFT array substrate 10. Thus, the shading member 42 is formed in the region facing the address line 18A, data line 24D and the amorphous silicon semiconductor layer 22.

On the semiconductor layer 20, drain electrode 24, source electrode 26 and the picture element electrodes on the TFT array substrate 10, there is formed an orientation film 30 for orienting the molecular axis of the liquid crystal material in a predetermined direction. Another orientation film 50 for orienting the molecular axis of the liquid crystal material in a predetermined direction is formed on the common electrode 40 and on the shading member 42.

A backlight 60 is provided on the side of the TFT array substrate 10. The shading member 42 formed of a material obtained by reducing ITO not only prevents the light incident on the side of the facing substrate 12 from entering the semiconductor layer 22, but also, because of the small reflection factor of the shading member 42, does not allow the light received from the backlight 60 through the transparent picture element electrodes 28 to reflect and enter the semiconductor layer 22.

Figure 3:
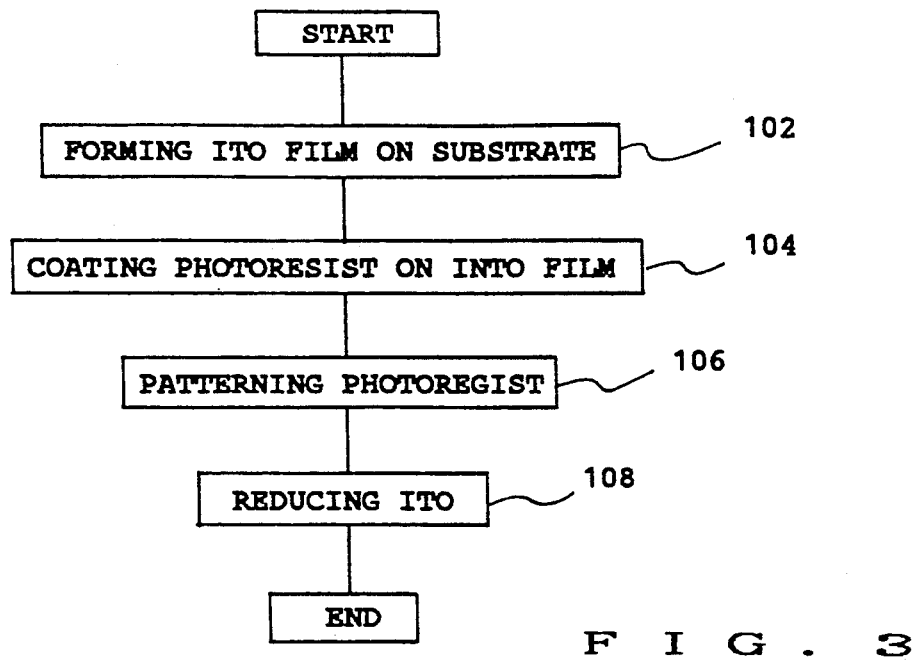
FIG. 3 is a flowchart showing an embodiment of the method for forming the shading member or a black matrix in an ITO single layer film.

FIG. 3 shows an embodiment of the method for forming the shading member or black matrix 42 in the ITO single layer film. FIG. 4(a) to FIG. 4(d) repesent the respective steps shown in FIG. 3. An ITO film 40 is formed on substrate 12 (step 102 of FIG. 3 and FIG. 4(a)). Then, photoresist 200 is coated on the overall surface of the ITO film 40 (step 104 of FIG. 3 and FIG. 4(b)). Then, by using a photomask which covers only the region corresponding to the picture element electrodes 28, (which, in other words, permits light to pass through the region corresponding to the semiconductor layer 22, the address line 18A and the data line 24D), the photoresist 200 is exposed, and developed. Then, only the part of the photoresist which has been exposed remains unremoved (step 106 of FIG. 3 and FIG. 4(c)).

Figure 4:
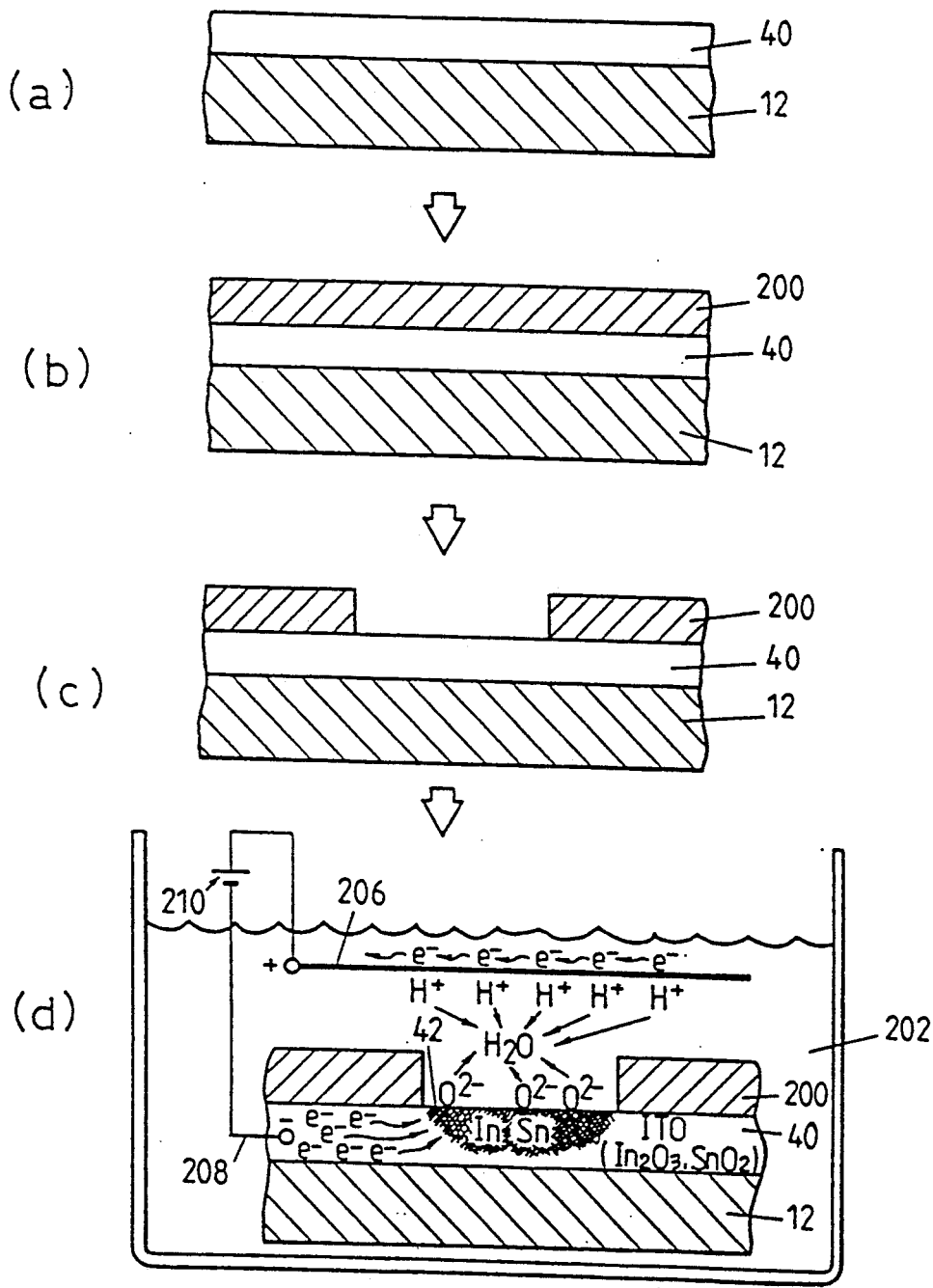
FIG. 4(a) to FIG. 4(d) are cross-sectional views of the successive steps shown in FIG. 3.

Then, the glass substrate 12 having thereon the ITO film 40 patterned with the photoresist 200 as described above is immersed in a conductive solution 202 containing hydrogen H, as shown in FIG. 4(d). The cathode of a DC power source 210 is connected to the ITO film 40. An anodic electrode 206 connected to the anode of source 210 is immersed in the conductive solution 202, and voltage is applied between the ITO film 40 and anodic electrode 206. Then, the following reactions take place in the ITO film 40 (the cathode):

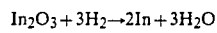

$In_2O_3 + 3H_2 \rightarrow 2In + 3H_2O$

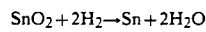

$SnO_2 + 2H_2 \rightarrow Sn + 2H_2O$

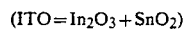

$(ITO = In_2O_3 + SnO_2)$

In this manner, the percentage of metal components in that part of the ITO which is not coated with the photoresist 200 increase, or the ITO is reduced (step 108 of FIG. 3). As a result, the light transmission in that part diminishes, thus providing a shading member 42.

Figure 5:
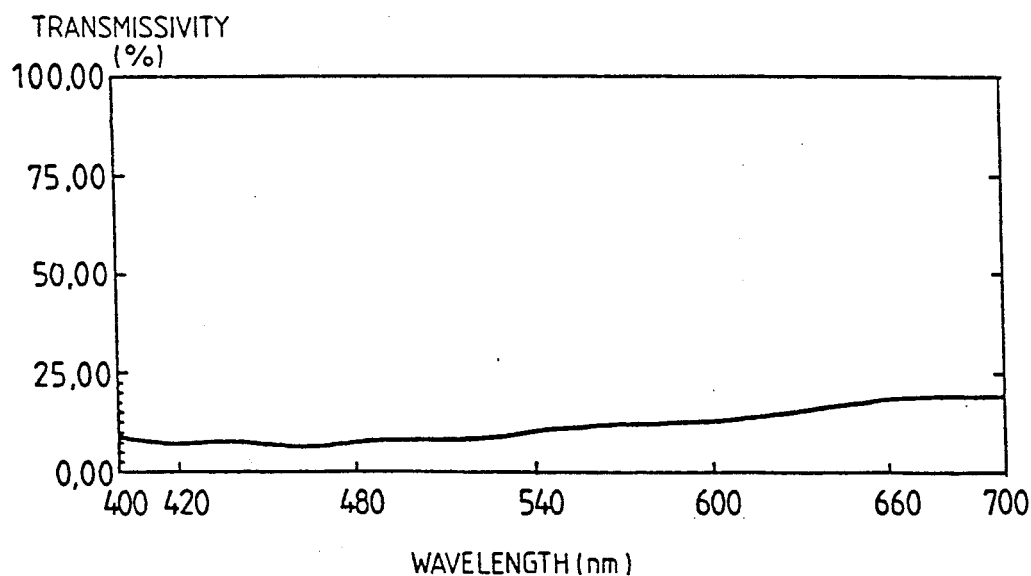
FIG. 5 is a graph illustrating the light transmission of the shading member formed by the method of FIG. 3.

The reduction of the ITO film may be performed by applying a voltage of $-20V$ to the ITO film (5% by weight of $SnO_2$ and 95% by weight of $InO_3$) for 3 minutes, using a 0.03% by weight citric acid solution as the conductive solution or electrolyte containing hydrogen. As shown in FIG. 5, a 10% to 20% transmissivity may be attained in the visible ray wavelength region (about 400 nm to 700 nm). These values are low enough for the material to be used as a shading member.

In addition, no difference in level occurred between the common electrode 40 and the shading member 42; the surface of each was disposed in the same plane.

The reduction is believed to depend on both voltage and time. Thus, if a sufficiently long time is expended, an even lower voltage, for example, as low as 10V, may be applied to the ITO film.

Further, any solution which is generally useable for an anodic oxidization process may be used as the hydrogen containing conductive solution.

The smaller the amount of oxygen in the ITO film, the lower the light transmission. By expending a sufficiently long time for reduction, the light transmissivity may be brought near 0%, but as it approaches 0%, the black material changes to a material having a metallic luster, which reflects the light from backlight 60, thus illuminating the semiconductor layer 22, and thereby producing photo-leakage current in the thin film transistors. It is for this reason that a light transmissivity of about 10 to 20% for the shading member 42 is considered appropriate.

Since the ITO film is used not only as the raw material of the shading member 42, but also as the transparent common electrode 40, the low resistance thereof should be maintained without any significant modification. From this standpoint, the composition of ITO (defined as $In_2O_3:SnO_2$) should desirably range from (95% by weight: 5% by weight) to (85% by weight: 15% by weight).

Thus, as described herein, this invention advantageously provides for diminishing the reflectivity of the shading member, without causing any difference in the level between the shading member and the transparent electrode. Further, it permits reducing the number of steps for manufacturing the transparent electrode and the shading member.

While this invention has been described in connection with a specific embodiment, it will be understood that those with skill in the art may be able to develop variations of the disclosed embodiment without departing from the spirit of the invention or the scope of the following claims:

What is claimed is:

1. A liquid crystal display comprising:

a first substrate;

an electrode disposed on said first substrate and having a composition containing indium tin oxide, said electrode having a selected region thereof reduced to lower the oxygen content in said selected region so that the transmissivitiy of said selected region is substantially reduced with respect to said portions of said electrode other than said selected region.

2. The liquid crystal display of claim 1 wherein the selected region is substantially non-reflective of light.

3. The liquid crystal display of claim 1 wherein said selected region has a light transmissivity of between approximately 10% and 20%.

4. The liquid crystal display of claim 1 wherein the selected region has a thickness equal to that of said electrode outside said selected region.

5. The liquid crystal display of claim 1 wherein the surfaces of said selected region and the surfaces of said electrode at portions thereof not in said selected region are coplanar.

6. The liquid crystal display of claim 1 further comprising a second substrate having picture elements thereon, said second substrate being disposed in facing relationship to said first substrate; wherein said selected region is disposed on said electrode to have portions opposite parts of said second substrate other than said picture elements.

7. The liquid crystal display device of claim 6 wherein said parts of said second substrate other than said picture elements have a thin film transistor disposed thereon.

8. The liquid crystal display of claim 1 wherein the indium tin oxide has a composition ranging from approximately 95% by weight $In_2O_3$ and 5% by weight $SnO_2$ to approximately 85% by weight $In_2O_3$ and 15% by weight $SnO_2$.

9. A method for manufacturing a liquid crystal display comprising the steps of:

forming indium tin oxide film on a transparent substrate; and reducing at least one selected region of said film in order to decrease light transmissivity of said region of said film.

10. The method of claim 9 wherein said light transmissivity is reduced to between approximately 10% and approximately 20%.

11. The method of claim 9 wherein in the at least one selected region the film is substantially non-reflective of light.

12. The method of claim 9 wherein the indium tin oxide has a composition ranging from approximately 95% by weight $In_2O_3$ and 5% by weight $SnO_2$ to approximately 85% by weight $In_2O_3$ and 15% by weight $SnO_2$.

13. The method of claim 9, further comprising the steps of:

providing a protective mask on portions of the film other than said at least one selected region;

immersing said film with said protective mask thereon in an electrically conductive solution containing hydrogen; and applying a voltage to said film in said electrically conductive solution so as to cause reduction of said film.

14. The method of claim 13 wherein said protective mask is a photoresist.

15. The method of claim 13 wherein said electrically conductive solution contains approximately 0.03% by weight citric acid.

16. The method of claim 13 wherein said voltage is approximately −20 volts.

17. The method of claim 13 wherein said voltage is between approximately −10 volts and approximately −20 volts.

18. The method of claim 13 further comprising the step of removing the protective mask after the film has been reduced in said at least one selected region.

* * * * *